April 20, 1965  J. McKAY FRASER ETAL  3,178,865
CLOSURES FOR CONTAINERS
Filed April 26, 1962  4 Sheets-Sheet 1

United States Patent Office 3,178,865
Patented Apr. 20, 1965

3,178,865
CLOSURES FOR CONTAINERS
James McKay Fraser, London, and George William Day, Dovercourt, England, assignors to Vacuumatic Limited and John Gosheron & Company Limited, London, England
Filed Apr. 26, 1962, Ser. No. 190,341
Claims priority, application Great Britain, May 4, 1961, 16,231/61
17 Claims. (Cl. 53—42)

The invention relates to closures for containers and in particular but not exclusively to a method and apparatus for applying closures to biscuit tins.

The conventional method of hermetically sealing biscuit tins so as to maintain the contents in a fresh and uncontaminated condition is to solder a sheet of thin tin plate over the aperture in the tin. This method, although most effective, is expensive, both in materials and labour, and it is the object of the present invention to provide a method and apparatus for overcoming this disadvantage.

The invention consists in a method for closing containers having an aperture therein for the filling and emptying thereof comprising transferring from a continuous band of supporting material an impervious sheet sealing material having a coating of tacky adhesive thereon to a container to cover the aperture and applying pressure to the sealing material to cause it to adhere to the container around the aperture and close the latter.

The invention further consists in a method as set forth in the preceding paragraph in which the sealing material is in portions of a size and shape upon the supporting material as appropriate to the size and shape of the aperture in the containers to be closed.

The invention further consists in apparatus for carrying out the above method comprising a feed support for a continuous band of supporting material having thereon impervious sheet sealing material with a coating of tacky adhesive, a support for a container, means for moving the band longitudinally of itself to bring the sealing material adjacent the aperture of a container positioned upon the support for the latter and to strip the support material from the sealing material, and pressure means for moving the sealing material towards and to cover the aperture and for causing the sealing material to adhere to the container and close the aperture.

The accompanying drawings show, by way of example only, one embodiment of the invention in which:

FIGURE 1 is a front elevation of a machine for applying closures to tins and the like;

FIGURE 3 is a plan view of the machine on the line 3—3 of FIGURE 1; while

Figure 1:
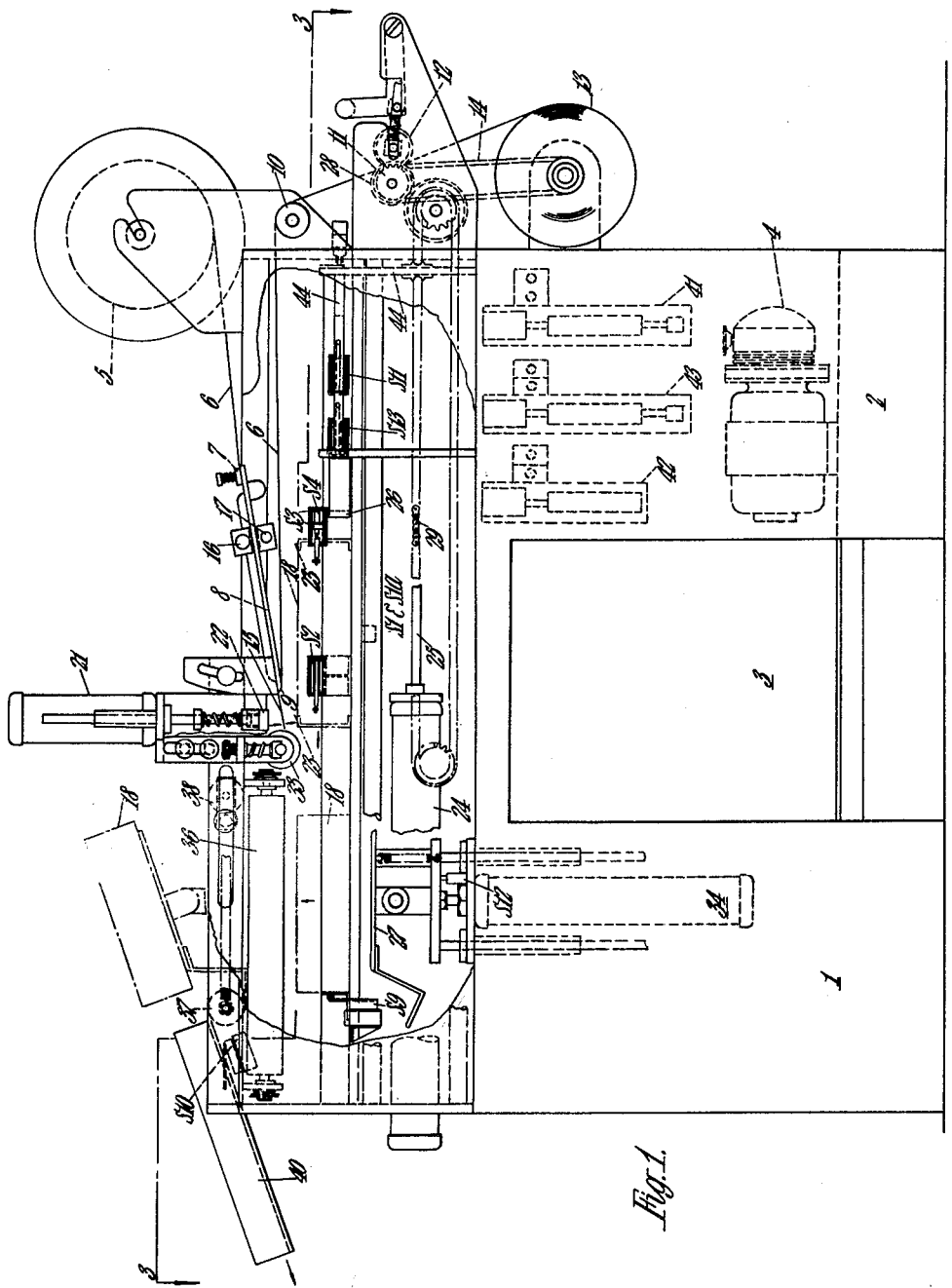

The machine is supported upon a metal frame and has two pedestals 1 and 2 providing a space 3 therebetween for the knees of the operator, the right pedestal 2 housing the main control switches and electrical supply means and electrically driven exhauster 4, or alternatively a compressor, for supplying the energy for carrying out the mechanical operations.

The closures for the tins are provided supported upon a continuous band of backing material of the kind usually provided for so-called self-adhesive labels and is supported on a reel 5 above the machine, the closures preferably being of aluminum foil laminated to paper in turn coated with a tacky latex type of self-adhesive. The closures are preferably pre-cut to the size as appropriate to the aperture in each tin to be closed and are spaced along the band at equal predetermined distances apart.

The band 6 passes from the reel 5 under the adjustable spring-loaded pressure strip 7 and down the sloping guide plate 8 to the forward edge 9 where it turns under and passes horizontally to the roller 10, between the intermeshing toothed rollers 11 and 12, by which the band is driven, and so to the take-up reel 13 driven by the belt 14 from the shaft of the roller 11.

Seeing that the closures for the tins are relatively stiff they continue in the plane of the sloping guide plate 8 to the position shown at 15, in which position the machine stops, and from which the cycle of operations commences. The feed of the band is stopped by the sensing device positioned above the band and the guide plate 8 and comprises a lamp 16 and a photo-transistor 17 and associated transistor amplifier and current supply means, not shown, housed in the right pedestal and including a relay which operates to interrupt electric current when the light shines through the support band in the space between the closures.

In consequence a closure 15 is always in the correct position when the cycle of operations commences, for application to a biscuit tin 18 placed below it as shown in position in the drawings. The tin is introduced into the machine by way of the door 19, which is hinged along its upper edge 20 and is slid in until located in the correct position. The door is provided with a safety switch S1 to prevent operation of the machine when the door is open. Until the tin is pushed into its correct position and the switches S2, S3 and S4 are operated the machine will not commence operation.

Figure 4:
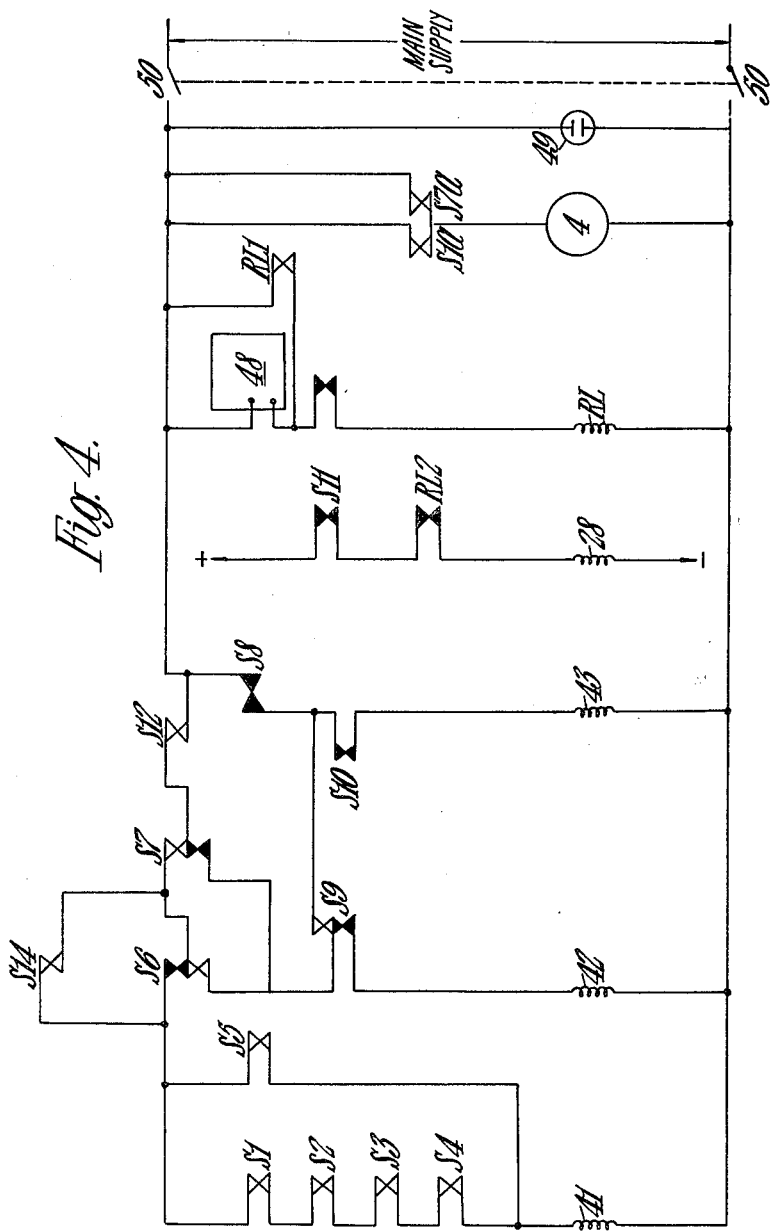
FIGURE 4 is a circuit diagram of the electrical control switching of the machine.

In order to make clear the understanding of the method of operation of the machine its working is described broadly firstly and is described in detail with reference to the switching diagram of FIGURE 4 hereinafter.

Figure 2:
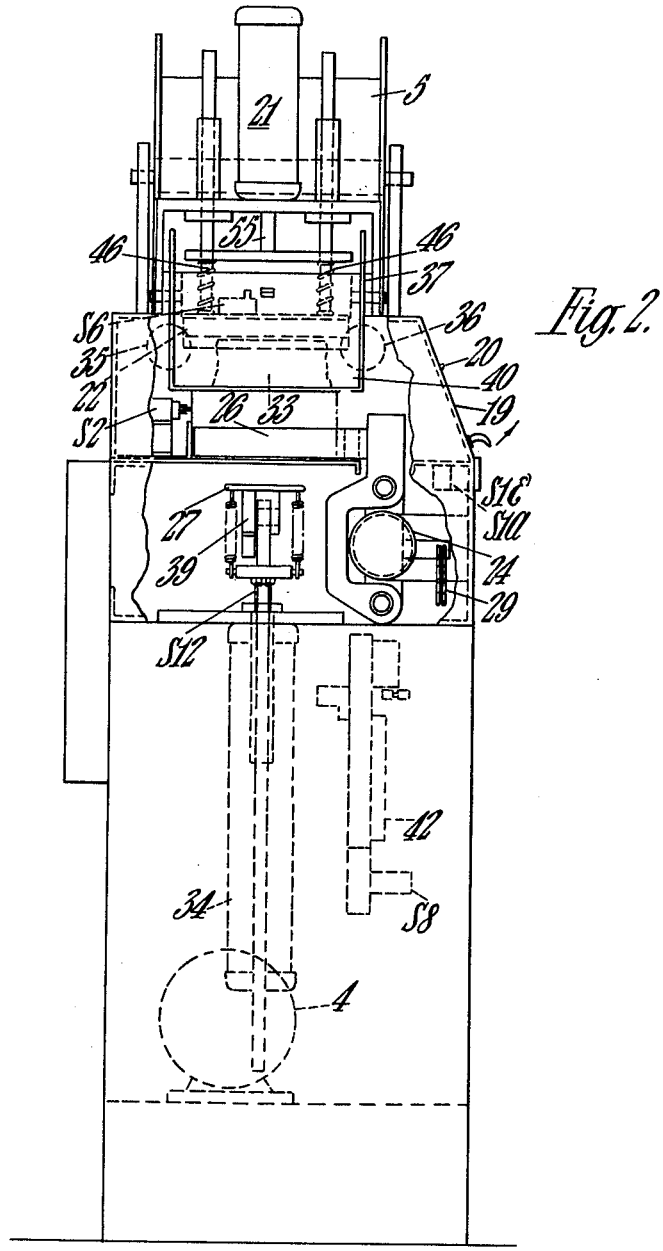
FIGURE 2 is an end elevation of the machine.
Figure 3:
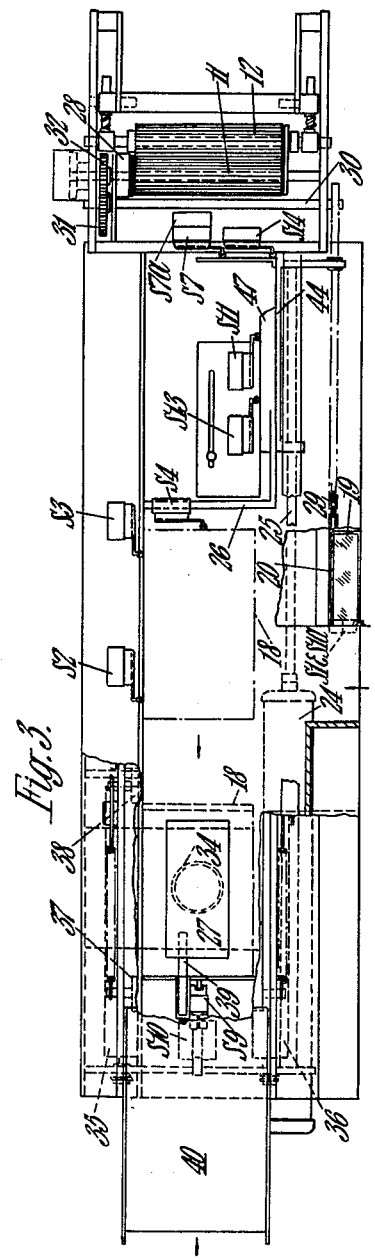

After the door is closed air is withdrawn by the exhauster 4 from the vertical cylinder 21 and the pressure bar 22 is lowered and presses down the leading edge of the closure 15 on to the turned in flange 23 of the leading edge of the tin. The pressure bar 22 is then lifted to its previous position, as shown in FIGURES 1 and 2, and air is exhausted from the horizontal cylinder 24 and its piston and piston rod 25 are moved to the left moving the tin 18 to the left by means of the pusher 26, until it arrives centrally over the lifting platform 27.

As soon as the pusher 26 engages the tin 18 an electrically operated clutch 28 on the shaft of the take-up toothed roller 11 is engaged, and the roller 11 is driven from the cylinder 24 by way of the chain 29, the shaft 30 and the gears 31 and 32. The rate of take-up of the support band 6 is the same as the rate of movement of the tin towards the platform 27, and consequently the closure 15 is stripped from the support band and is transferred to the aperture in the tin 18.

In its movement the tin 18 passes under the spring-loaded roller 33 which presses the closure tightly down on the flange around the tin 18 and to which it is firmly attached by the adhesive.

As soon as the tin 18 has reached the platform 27 the pusher 26 is withdrawn and the platform is lifted by the cylinder 34 between the spring-loaded rollers 35 and 36, and 37 and 38 which roll the projecting edges of the closure down the sides and ends of the tin.

The platform 27 is hinged upon the piston rod of the cylinder 34 and is provided with a tongue 39 which engages under the roller 37 which, in the elevated position, tips off the tin on to the slide 40 where it operates the switch S10 as it leaves the machine, thereby causing the latter to be restored to the condition preparatory to the commencing of another cycle of operation.

The take-up of the support band is stopped by the disengagement of the clutch 28 by the sensing means 16 and 17 actuated by the arrival of the next closure in the desired position for transfer to the next tin.

As mentioned before the motive power for the machine is provided by the electrically driven exhauster 4, while the passage of air from the double acting cylinders 21, 24 and 34 is controlled by solenoid operated control valves 41, 42 and 43. These valves are spring-loaded so that at de-energising of the respective solenoids the valves each return to their original position.

The sequence of operation of the machine during one cycle is as follows. The supply means having been turned on by the main switch 50 current reaches the exhauster 4 by way of the switch S7a which is closed if the pusher frame 44 is fully to the right, or alternatively by way of the switch S1a if the door is closed. The result of this duplication of switches S1a and S7a is that whenever the door is opened during the cycle the machine is instantly stopped since pusher frame 44 has moved away from switch S7a and that the power can only be on when the door is opened when the machine is at rest ready to commence the cycle of operation.

The cycle of operation is initiated by opening the door, which opens switch S1, normally held mechanically closed, and by placing the box in the correct position which closes switches S2, S3 and S4. From the circuit diagram of FIGURE 4 it can be seen that switches S1–4 are in series with the solenoid 41 and therefore, on closing the door, current flows to this solenoid and the valve associated therewith connects the exhauster to cylinder 21 to cause the pressure bar 22 to be lowered. At the same time the switch S5 on the solenoid is closed and takes over from the switches S1–4 and the pressure bar continues to be lowered until it reaches the tin and by the continued movement of the piston rod against the action of the springs 46 the switch S6 is operated and removes the connection from solenoid 41 and makes connection to solenoid 42.

At this instant the pressure bar is lifted and the pusher cylinder 24 is operated by the control valve associated with the solenoid 42 to withdraw the piston rod 25 into the cylinder and move the frame 44 and the pusher 26 attached thereto to the left. Immediately the pusher moves the function of switch S6 is taken over by switch S7 and switch S7a is opened so that the door switch S1a controls the main supply to the exhauster.

When the pusher is moved to the position where it just touches the back end of the tin the lever of switch S11 slips off the cam 47 and closes the circuit to the electrically operated clutch 28, and causes take-up of the support band to commence.

The pusher continues its movement until the tin meets the switch S9 which interrupts the flow of current to solenoid 42 and at the same time provides a path to solenoid 43 which operates the valve to exhaust air from the vertical cylinder 34.

Before the pusher reaches the end of its stroke towards the platform 27, the support band 6 has brought the next closure into position for the next tin, the band being stopped when the sensing device 48 comprising the lamp 16 and the photo-transistor 17 coincides with the gap between the closures. The amplifier associated with the photo-transistor 17 includes a relay RL having two pairs of contacts RL1 and RL2, RL1 being normally open, but when the device operates it is closed to hold the circuit during movement of the band, while contacts RL2 are normally closed and by way of which the 6 volt D.C. current is supplied to the clutch 28 and therefore when the next closure is in the correct position the clutch is disengaged and the take-up of the band is stopped.

As soon as the pusher commences to return to the right of the machine, the platform 27 is elevated and the function of switch S9 taken over by switch S8 and the tin deposited upon the slide 40 where it operates the switch S10 which interrupts the supply to solenoid 43 and allows it to return to its normal position when the platform falls to its lower position.

Once the gap between the closures has passed the sensing device, S13 is closed having been previously held mechanically open to prevent RL being operative. RL will now become operative upon the arrival of the next gap between the closures at the photo-electric device.

Switch S14 is closed when the pusher is fully to the right and is in parallel with switch S6 and acts to hold the pressure bar 22 down until the movement of the pusher has just commenced, but releases it before the pusher contacts the tin.

Switch S12 below the elevating platform is open when the platform is up and therefore commencement of a new cycle cannot take place until the platform has been lowered.

The neon 49 acts as an indicator as to when the apparatus is switched on.

The position of the switches S11 and S13, the width between the guides and the positions of the pressure rollers may be adjusted to suit variations in the sizes of tins used with the apparatus.

In the constructions above described a support band is used having a single row of closures thereon, but there is no reason why a double or treble or greater number of closures should not be provided so that two or three or more tins can be dealt with simultaneously. Furthermore, it is within the scope of the invention to provide a continuous strip of closure material on the support band and to cut off the required amount as each tin is covered.

Although it is preferred to form the closures of aluminium foil of two thousandths of an inch thickness on paper backing of five thousandths of an inch thickness other materials and other thicknesses can be used if desired. For example, the closure may be formed of synthetic resin sheet, prepared paper or the like depending upon the use to which the container is to be put and the extent of hermetic sealing required.

The invention is not restricted to rectangular boxes or to rectangular openings nor to openings of which the periphery lies in one plane.

In the arrangement above described the contents of the tin are provided with a wrapping which prevents contact with the exposed adhesive on the closure.

In an alternative arrangement of closures used in the arrangement described they may each be pre-cut to a rectangular shape as appropriate to the size and shape of the aperture to be covered, while each closure is provided with a rectangular cut in the backing paper positioned centrally within the closure so that when the closure is stripped from the support band the paper rectangle is retained upon the band and only the margins are retained with the adhesive on the tin so that the contents of the tin are not exposed to adhesive in the centre of the closure.

The apparatus can be positioned in the path of a conveyor and can thus be operated fully automatically.

It is to be understood that the above description is by way of example only and that details for carrying the invention into effect may be varied without departing from the scope of the invention claimed.

We claim:
1. In the closing of containers of the type having an aperture therein for the filling and emptying thereof and comprising transferring impervious sheet sealing material having a coating of tacky adhesive thereon from a longitudinally moving continuous band of supporting material sequentially to each of a plurality of containers to cover the apertures therein and applying pressure to the sealing material to cause the same to adhere to the containers around the apertures so as to close the latter, the improvement comprising constraining the continuous band to follow a path including an abrupt change of direction while allowing the impervious sheet sealing material to continue to move in the initial direction of movement of the band, disposing a container beneath the impervious sheet sealing material in advance of the change of direction of the band and applying said pressure to the sheet material as the band continues to move in its change of direction so that the band is stripped from the sheet sealing material.

2. The method as claimed in claim 1 and moving the containers to be closed in the same direction and at the same speed as the sealing material as such material leaves said band.

3. The method as claimed in claim 2 and said sheet sealing material being constituted by separate portions, each of a size and shape appropriate to the size and shape of the aperture in the containers to be closed.

4. The method as claimed in claim 3 and initially contacting the leading edge of each successive portion of sealing material with each successive container during the transfer thereto.

5. Apparatus for closing containers of the type having an aperture therein for the filling and emptying thereof and comprising support means for a continuous band of supporting material carrying thereon impervious sheet sealing material having a coating of tacky adhesive, a support for a container, means for sequentially moving each of a plurality of containers on said support from and past an initial transfer position on said support, said support means including means for moving the band longitudinally of itself and band guide means defining a path of movement for the band effective to cause the band to follow a path which has an abrupt change of direction adjacent said initial transfer position occupied by a container on said support whereby the band is stripped from the sealing material by the movement of the band and pressure applying means for moving the sealing material towards and into contact with each successive container around its aperture so as to cause the sealing material to adhere to the container and close the aperture therein.

6. Apparatus as claimed in claim 5 in which the band has individual portions of sealing material thereon spaced longitudinally of the band and each portion being of a size and shape appropriate to the size and shape of the apertures in the containers to be closed, the means for moving each container from and past said initial transfer position and said pressure applying means including cyclically operating pneumatic piston and cylinder means, and sensing means disposed adjacent the path followed by the band in advance of said initial transfer position and operative to control the cyclic operation of said piston and cylinder means responsive to the movement of said sealing material portions.

7. Apparatus as claimed in claim 6 in which said sensing means comprise photo-electric sensing means by which light passes through said band at the space between the successive sealing portions but not through the sealing portions, said sensing means initiating a signal impulse and control means operative in response to said impulses and operatively coupled with the means for moving the band for stopping the movement of the band when the cycle of operation of the machine is complete.

8. Apparatus for successively closing containers of the type having a filling and emptying aperture therein with impervious sheet sealing material having a coating of tacky adhesive, said apparatus comprising a support adapted to receive and rotatably support a supply roll of a band of supporting material having separate sheet sealing material portions spaced longitudinally of said band and held thereon by such adhesive, a support means for receiving containers to be closed, movable pressure applying means disposed above said support means for movement toward and away from such support means, a guide plate mounted above said support means and disposed between said support and said pressure applying means, a take-up reel on the side of said plate opposite said pressure applying means and band accommodating rollers including drive rollers with respect to which the band is trained to follow a path over the upper surface of said guide plate toward said pressure applying means, around the forward edge of said guide plate and back toward and through said drive rollers and onto said reel, means for moving a container on said support from beneath and past said pressure applying means and means operative to cause said drive rollers to move said band while the container is moved from beneath said pressure applying means so that said band is stripped from the separate sheet sealing material portions, said pressure applying means being operative to contact said strip material portions and apply them to the containers.

9. Apparatus as claimed in claim 8 in which the cycle of operation of the machine is completed with the band in such a position that the forward edge of a sealing portion projects beyond the forward edge of the guide plate and the portion of the band passing around such edge of the guide plate, and positioning members located in operative relation to said support means and guide plate for assuring that a container is positioned on said support means only in such a position that said forward edge of the sealing portion is above and adjacent to the forward edge of the aperture in the container.

10. Apparatus as claimed in claim 8 and said pressure applying means including a pressure plunger located to be above the forward edge of separate sealing portion when such portion is in its position at the completion of the cycle of operation of the machine, said plunger being operative upon initiation of all cycles of operation to momentarily move downward to bring the forward edge of such a sealing portion in contact with and attach it to the front edge of the aperture in the container.

11. Apparatus as claimed in claim 10 and further including a spring-loaded pressure roller extending transversely of, above the support means in advance of said plunger and operative to overlay the separate sealing portions around the periphery of the aperture in a container if the container is moved across said support means.

12. Apparatus as claimed in claim 11 in which said support means comprises a platform, a vertically movable lifting platform separately associated with said first-mentioned platform at a position forward of said spring-loaded pressure roller, two pairs of spring-loaded rollers supported above said vertically movable lifting platform, the means for moving the containers being operative to move the same upon said vertically movable platform and means operative in response to withdrawal movement of the means for moving the container effecting an upward movement of said vertically lifting platform so that a container having sealing portions thereon is forced between said pairs of spring-loaded rollers so that the edges of the separate sealing portion is turned downward and adheres to the sides of the containers to complete the closing thereof.

13. Apparatus as claimed in claim 12 and including a piston and cylinder mechanism for effecting vertical movement of said vertically movable lifting platform, means pivotally connecting said lifting platform to one of said piston and cylinder, a trip member carried by said lifting platform and disposed such that when the lifting platform has passed through said pairs of rollers, the platform is pivoted and a discharge slide positioned to receive a closed container as it slides off the pivoted lifting platform.

14. Apparatus for successively applying to containers a sheet material having a coating of tacky adhesive, said apparatus comprising in combination, a support particularly adapted to receive and rotatably support material having separate sheet material portions spaced longitudinally of said band and held thereon by such adhesive, support means for sequentially receiving at least more than one container, means for sequentially supplying at least more than one container to said support means, pressure applying means disposed for movement with respect to said support means, a guide plate disposed adjacent said support and said pressure applying means, means defining a path of movement for said supporting band subsequent to movement thereof upon and along said guide plate comprising an abrupt change of direction about a leading edge thereof, and means for moving a container on said support means towards and past said pressure applying means, said pressure applying means being operative to contact said separate sheet material portions and apply them to said containers.

15. Apparatus for successively applying to containers an impervious sheet material having a coating of tacky adhesive, said apparatus comprising a support adapted to receive and rotatably support a supply roll of a band of supporting material having separate sheet material portions spaced longitudinally of said band and held thereon by such adhesive, a support means for receiving containers, movable pressure applying means disposed above said support means for movement with respect to said support means, a guide plate mounted above said support means and disposed adjacent said support and said pressure applying means, a take-up reel on the side of said plate opposite said pressure applying means and band accommodating rollers including drive rollers with respect to which the band is trained to follow a path over the upper surface of said guide plate toward said pressure applying means, around the forward edge of said guide plate and back toward and through said drive rollers and onto said reel, means for moving a container of said support from beneath and past said pressure applying means and means operative to cause said drive rollers to move said band while the container is moved from beneath said pressure applying means so that said band is stripped from the separate sheet material portions, said pressure applying means being operative to contact said strip material portions and apply them to the containers.

16. Apparatus as claimed in claim 15 in which said support means comprises a platform disposed below said guide plate and extending in a direction therefrom to at least beyond the forward edge of the guide plate.

17. Apparatus as claimed in claim 15 in which the means for moving the containers includes a pusher operative to move above the surface of the support means for engaging a container and moving the same across said support means, and said pusher being synchronized with said drive rollers so that it moves a container in the same direction and at the same speed of movement as the portion of the band that is moving above the guide plate.

References Cited by the Examiner
UNITED STATES PATENTS

| | | | |
|---|---|---|---|
| 2,955,395 | 10/60 | Aubry | 53—389 XR |
| 3,014,320 | 12/61 | Harrison | 53—296 XR |
| 3,029,569 | 4/62 | Taylor | 53—38 XR |

FRANK E. BAILEY, *Primary Examiner.*

ROBERT A. LEIGHEY, *Examiner.*